US011299666B2

(12) United States Patent
Levache et al.

(10) Patent No.: US 11,299,666 B2
(45) Date of Patent: Apr. 12, 2022

(54) SURFACTANT COMPOSITION FOR THE REINJECTION OF PRODUCED WATER

(71) Applicants: TOTAL SE, Courbevoie (FR); CENTRE NATIONAL DE LA RECHERCHE SCIENTIFIQUE, Paris (FR); SORBONNE UNIVERSITE, Paris (FR); ECOLE SUPERIEURE DE PHYSIQUE ET DE CHIMIE INDUSTRIELLES DE LA VILLE DE PARIS, Paris (FR)

(72) Inventors: Bertrand Levache, Pau (FR); Aurélie Le Beulze, Pau (FR); Nicolas Passade-Boupat, Pau (FR)

(73) Assignees: Total SE, Paris (FR); Central National de la Recherche Scientifique, Paris (FR)

( * ) Notice: Subject to any disclaimer, the term of this patent is extended or adjusted under 35 U.S.C. 154(b) by 35 days.

(21) Appl. No.: 16/763,530

(22) PCT Filed: Nov. 14, 2017

(86) PCT No.: PCT/IB2017/001572
§ 371 (c)(1),
(2) Date: May 12, 2020

(87) PCT Pub. No.: WO2019/097272
PCT Pub. Date: May 23, 2019

(65) Prior Publication Data
US 2020/0362230 A1 Nov. 19, 2020

(51) Int. Cl.
*C09K 8/60* (2006.01)

(52) U.S. Cl.
CPC .................... *C09K 8/604* (2013.01)

(58) Field of Classification Search
CPC ...................................... C09K 8/604
See application file for complete search history.

(56) References Cited

U.S. PATENT DOCUMENTS

| 3,811,505 | A | | 5/1974 | Flournoy et al. | |
|---|---|---|---|---|---|
| 4,276,933 | A | * | 7/1981 | Kudchadker | C09K 8/584 166/266 |

(Continued)

FOREIGN PATENT DOCUMENTS

| FR | 3031521 A1 | 1/2015 |
|---|---|---|
| WO | WO 2014063761 A1 | 5/2014 |

(Continued)

OTHER PUBLICATIONS

Wang et al. "Development and Application of Dilute Surfactant-Polymer Flooding System for Shengli Oilfield" Journal of Petroleum Science and Engineering 65, Dated 2009, pp. 45-50.

(Continued)

*Primary Examiner* — Crystal J. Lee
(74) *Attorney, Agent, or Firm* — Knobbe, Martens, Olson & Bear, LLP

(57) ABSTRACT

The invention relates to the use of a non-ionic surfactant and an anionic surfactant for enhancing the injectivity of an injection well, wherein the non-ionic surfactant and the anionic surfactant are added to produced water, to form a reinjection stream which is injected into a subterranean formation by the injection well.

16 Claims, 1 Drawing Sheet

(56) References Cited

U.S. PATENT DOCUMENTS

| | | | |
|---|---|---|---|
| 4,293,428 A | 10/1981 | Gale et al. | |
| 4,464,268 A | 8/1984 | Schievelbein | |
| 4,690,217 A | 9/1987 | Taggart et al. | |
| 5,501,276 A | 3/1996 | Weaver et al. | |
| 5,678,631 A | 10/1997 | Salisbury et al. | |
| 6,972,274 B1 | 12/2005 | Slikta et al. | |
| 2006/0035789 A1 | 2/2006 | Mas et al. | |
| 2012/0067579 A1 | 3/2012 | Pich et al. | |
| 2016/0251568 A1* | 9/2016 | Do | C09K 8/885 166/270.1 |

FOREIGN PATENT DOCUMENTS

| | | |
|---|---|---|
| WO | WO 2015097018 A1 | 7/2015 |
| WO | WO 2016176385 A1 | 11/2016 |

OTHER PUBLICATIONS

Buret et al. "Water Quality and Well Injectivity: Do Residual Oil-in-Water Emulsions Matter?", SPE Journal Dated Jun. 2010, pp. 557-568.

* cited by examiner

SURFACTANT COMPOSITION FOR THE REINJECTION OF PRODUCED WATER

TECHNICAL FIELD

The present invention relates to the use of a surfactant composition for the reinjection of produced water in the context of the production of hydrocarbon from a subterranean formation.

TECHNICAL BACKGROUND

Hydrocarbons (such as crude oil) are extracted from a subterranean formation (or reservoir) by means of one or more production wells drilled in the reservoir. Before production begins, the formation, which is a porous medium, is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, there is still a large volume of hydrocarbons left in the reservoir, generally more than two thirds.

This phenomenon has been known for a long time and has led to the development of improved oil recovery (IOR) techniques. Many of such IOR techniques rely on the injection of a fluid into the reservoir in order to produce an additional quantity of hydrocarbons. The fluid used can include water in a liquid form (optionally in combination with chemicals) or as steam. It can be injected via one or more injection wells.

As a result of this injection, large amounts of water are in turn recovered from the production wells. This is called "produced water". If the produced water is discharged to the environment, it has to be treated to decontaminate it, which is costly and cumbersome. Alternatively, the produced water may be reinjected into the subterranean formation via the injection wells.

However, in this case, the injection wells tend to get clogged over time, due to the presence of small solid particles and residual oil in the produced water, which results in the formation of larger size aggregates. As more and more produced water is reinjected, the injectivity of the injection wells decreases to an unacceptably low level. In order to restore this injectivity, the injection wells need to be cleaned either by a direct intervention in situ, which is complex and requires stopping the injection; or by injecting an appropriate cleaning composition.

However, existing cleaning techniques do not address this injectivity issue in an efficient and durable manner.

Document FR 3031521 discloses a method for improving and/or maintaining injectivity of an injection well by using a fatty alkoxylated amine, which is a cationic surfactant. However, the efficiency of this compound is heavily dependent on the amount and reactivity of the oil.

Document U.S. Pat. No. 6,972,274 discloses a method of restoring the permeability of a porous underground petroleum formation, using a combination of at least one non-ionic compound and at least one cationic compound in an amount effective to improve the permeability of the formation. However, the efficiency of a cationic compound is heavily dependent on the amount and reactivity of the oil. Besides, the document teaches to use the combination of compounds at a relatively high concentration of 0.1 to 10% by weight, which seems to preclude a continuous injection.

Document U.S. Pat. No. 4,690,217 discloses a method of enhancing the injectivity of water injection wells using an anionic surfactant. However, the document teaches to use this surfactant at a relatively high concentration of 0.1 to 5% by weight, which seems to preclude a continuous injection.

Document U.S. Pat. No. 4,464,268 discloses a method for restoring permeability of an injection well comprising treating the well with an aqueous solution containing hydrogen peroxide and optionally a surfactant. Again, the document teaches to use high amounts of chemicals.

Document U.S. Pat. No. 5,501,276 addresses another problem which is the removal of drilling fluid and filter cake deposited on the walls of a wellbore during drilling operations. Use is made of a removal composition comprising an aqueous sugar solution.

Document U.S. Pat. No. 5,678,631 addresses the problem of cleaning a well system and equipment after the drilling operations. Use is made of a chemical additive that includes an alkene alcohol such as a terpene, and an ether amine or base fluid.

Document WO 2014/063761 relates to a well treatment composition inter alia comprising a lipophilic anionic surfactant, a hydrophilic non-ionic surfactant and a second non-ionic surfactant. This composition is used as a spacer fluid or chemical wash for a well, in the context of the process of well cementing.

Document US 2006/0035789 discloses a surfactant blend for servicing wells, including two non-ionic surfactants and an anionic surfactant. This blend addresses the problem of mud cake formed from oil-based drilling fluid.

Document WO 2016/176385 discloses a co-surfactant foam forming composition for enhanced oil recovery (EOR). The composition comprises a non-ionic surfactant and an anionic surfactant. It is used in particular in the context of water alternating gas (WAG) cycles, wherein water-based fluid injection alternates with typically $CO_2$-based fluid injection. The purpose of the foam formation is to divert the flow of the $CO_2$ into a portion of the subterranean formation containing high oil saturation and thus overcome the problem associated with the channeling of the gas bypassing the oil.

Document U.S. Pat. No. 4,276,933 discloses a method of oil recovery wherein first, an aqueous slug containing an anionic surfactant is injected into the subterranean formation via an injection well; second, a postflush aqueous slug containing a non-ionic solubilizer is injected; and third, an aqueous drive agent is injected to displace the surfactant slug.

Document U.S. Pat. No. 4,293,428 discloses a flooding process wherein use is made of a polyalkoxylated surfactant. The surfactant is supposed to be used at a high volume concentration of 1-20%.

Document WO 2015/097018 belongs to the technical field of marine decontamination. A method is provided for determining the composition of a mixture of surfactants, comprising preparing several mixtures of surfactants, mixing them with an aqueous solution and hydrocarbons, and identifying one or more mixtures having a micro-emulsion phase.

There is thus currently still a need for a method of enhancing the injectivity of an injection well in an efficient and durable manner, preferably without using large quantities of chemicals.

SUMMARY OF THE INVENTION

It is a first object of the invention to provide the use of a non-ionic surfactant and an anionic surfactant for enhancing the injectivity of an injection well, wherein the non-ionic surfactant and the anionic surfactant are added to produced water, to form a reinjection stream which is injected into a subterranean formation by the injection well.

In some embodiments, the injectivity of the injection well is increased by a factor of at least 1.5, preferably of at least 2 or of at least 3 or of at least 4 relative to the injectivity of the injection well when the non-ionic surfactant and the anionic surfactant are not present in the reinjection stream containing produced water which is injected into the subterranean formation by the injection well.

In some embodiments, the injectivity of the injection well is maintained or restored at a level of at least 30%, preferably at least 50%, more preferably at least 60%, and most preferably at least 70%, relative to the maximal injectivity of the injection well.

In some embodiments, the total concentration of the non-ionic surfactant and anionic surfactant in the reinjection stream is less than 500 ppm, preferably less than 200 ppm, more preferably less than 100 ppm and even more preferably less than 50 ppm, by weight.

In some embodiments, the non-ionic surfactant is of formula $R^1$—X, wherein $R^1$ is a saturated or unsaturated aliphatic or aromatic group having from 10 to 18 carbon atoms, a mean degree of unsaturation from 0 to 3, and a mean degree of branching of from 0 to 5, and X is a hydrophilic group.

In some embodiments, X is selected from polyoxyalkylene groups, sorbitan groups, polyethoxylated sorbitan groups, polyglyceryl groups and glycosidic groups.

In some embodiments, —X is —O—$(CH_2CH_2O)_p$—H, wherein p is from 1 to 20 and preferably from 10 to 15.

In some embodiments, the anionic surfactant is of formula $R^2$—Y, wherein $R^2$ is a saturated or unsaturated aliphatic or aromatic group having from 10 to 18 carbon atoms, a mean degree of unsaturation from 0 to 3, and a mean degree of branching of from 0 to 5, and Y is a hydrophilic group.

In some embodiments, Y is selected from sulfonate groups, sulfate groups and anionically modified polyoxyalkylene groups, such as sulfonate-terminated, carboxylate-terminated or sulfate-terminated polyoxyalkylene groups.

In some embodiments, —Y is —O—$(CH_2CH(R^3)O)_m$—$(CH_2CH_2O)_n$—$SO_3^-M^+$, wherein:
$R^3$ is an aliphatic or aromatic group having from 1 to 10 carbon atoms, preferably selected from methyl, ethyl, n-propyl and/or phenyl groups, and more preferably a methyl group,
m is from 1 to 20 and preferably from 5 to 10,
n is from 0 to 5 and preferably from 0 to 1, and
$M^+$ is a monovalent cation, preferably selected from $Li^+$, $Na^+$ and $K^+$.

In some embodiments, the weight proportion of anionic surfactant relative to the total of the anionic surfactant and non-ionic surfactant in the reinjection stream is from 50 to 95%, preferably from 65 to 90%, more preferably from 75 to 85%, and even more preferably approximately 80%.

In some embodiments, the anionic surfactant and non-ionic surfactant are continuously added to the produced water for a period of time of at least 1 month, preferably of at least 2 months, more preferably of at least 6 months.

In some embodiments, the produced water has a salinity of from 10 to 100 g/L.

In some embodiments, the above use is in a waterflooding process of oil recovery.

In some embodiments, the nature and/or proportions of the non-ionic surfactant and the anionic surfactant are selected by preparing a plurality of mixtures of non-ionic surfactant, anionic surfactant, produced water or simulated produced water, and oil, agitating the plurality of mixtures and identifying a mixture which provides a water/oil microemulsion.

It is a second object of the invention to provide a method of extracting hydrocarbons from a subterranean formation, comprising:
collecting a production stream comprising hydrocarbons and produced water from at least one hydrocarbon production well;
separating the production stream into at least one or more hydrocarbon streams as well as a stream of produced water;
continuously adding a non-ionic surfactant and an anionic surfactant to at least part of the stream of produced water to provide a reinjection stream; and
continuously injecting said reinjection stream into the subterranean formation by at least one injection well.

In some embodiments, the injection well has an injectivity which is maintained or restored at a level of at least 30%, preferably at least 50%, more preferably at least 60%, and most preferably at least 70%, relative to its maximal injectivity.

In some embodiments, the total concentration of the non-ionic surfactant and anionic surfactant in the reinjection stream is less than 500 ppm, preferably less than 200 ppm, more preferably less than 100 ppm and even more preferably less than 50 ppm, by weight.

In some embodiments, the non-ionic surfactant is of formula $R^1$—X, wherein $R^1$ is a saturated or unsaturated aliphatic or aromatic group having from 10 to 18 carbon atoms, a mean degree of unsaturation from 0 to 3, and a mean degree of branching of from 0 to 5, and X is a hydrophilic group.

In some embodiments, X is selected from polyoxyalkylene groups, sorbitan groups, polyethoxylated sorbitan groups, polyglyceryl groups and glycosidic groups.

In some embodiments, —X is —O—$(CH_2CH_2O)_p$—H, wherein p is from 1 to 20 and preferably from 10 to 15.

In some embodiments, the anionic surfactant is of formula $R^2$—Y, wherein $R^2$ is a saturated or unsaturated aliphatic or aromatic group having from 10 to 18 carbon atoms, a mean degree of unsaturation from 0 to 3, and a mean degree of branching of from 0 to 5, and Y is a hydrophilic group.

In some embodiments, Y is selected from sulfonate groups, sulfate groups and anionically modified polyoxyalkylene groups, such as sulfonate-terminated, carboxylate-terminated or sulfate-terminated polyoxyalkylene groups.

In some embodiments, —Y is —O—$(CH_2CH(R^3)O)_m$—$(CH_2CH_2O)_n$—$SO_3^-M^+$, wherein:
$R^3$ is aliphatic or aromatic group having from 1 to 10 carbon atoms, preferably selected from methyl, ethyl, n-propyl and/or phenyl groups, and more preferably a methyl group,
m is from 1 to 20 and preferably from 5 to 10,
n is from 0 to 5 and preferably from 0 to 1, and
$M^+$ is a monovalent cation, preferably selected from $Li^+$, $Na^+$ and $K^+$.

In some embodiments, the weight proportion of anionic surfactant relative to the total of the anionic surfactant and non-ionic surfactant in the reinjection stream is from 50 to 95%, preferably from 65 to 90%, more preferably from 75 to 85%, and even more preferably approximately 80%.

In some embodiments, the above method is continuously implemented for a period of time of at least 1 month, preferably of at least 2 months, more preferably of at least 6 months.

In some embodiments, the produced water has a salinity of from 10 to 100 g/L.

In some embodiments, the above method is a waterflooding process for oil recovery.

The present invention addresses the need expressed above. In particular the invention provides a method of enhancing the injectivity of an injection well in an efficient and durable manner. It is not necessary to use large quantities of chemicals in order to implement this method.

This is made possible by combining an anionic surfactant and a non-ionic surfactant in the reinjected produced water. A selection of the surfactants and of their respective amounts can be performed in order to optimize the efficacy of the enhancement of injectivity.

The invention may also provide one or more of the following advantages:
- the cost of the surfactants used in the invention is relatively low in comparison with prior art methods, such as e.g. those which involve the use of a cationic surfactants;
- the enhancement of injectivity is larger than in the prior art;
- the enhancement of injectivity is achieved over a long period of time;
- the invention may be implemented with a large variety of surfactants;
- the invention may be implemented at various levels of salinity, including high levels of salinity;
- the surfactants used in the invention may have low or no toxicity and be environment-friendly;
- the invention may be implemented with a low total amount of surfactants.

DESCRIPTION OF EMBODIMENTS

Figure 1:
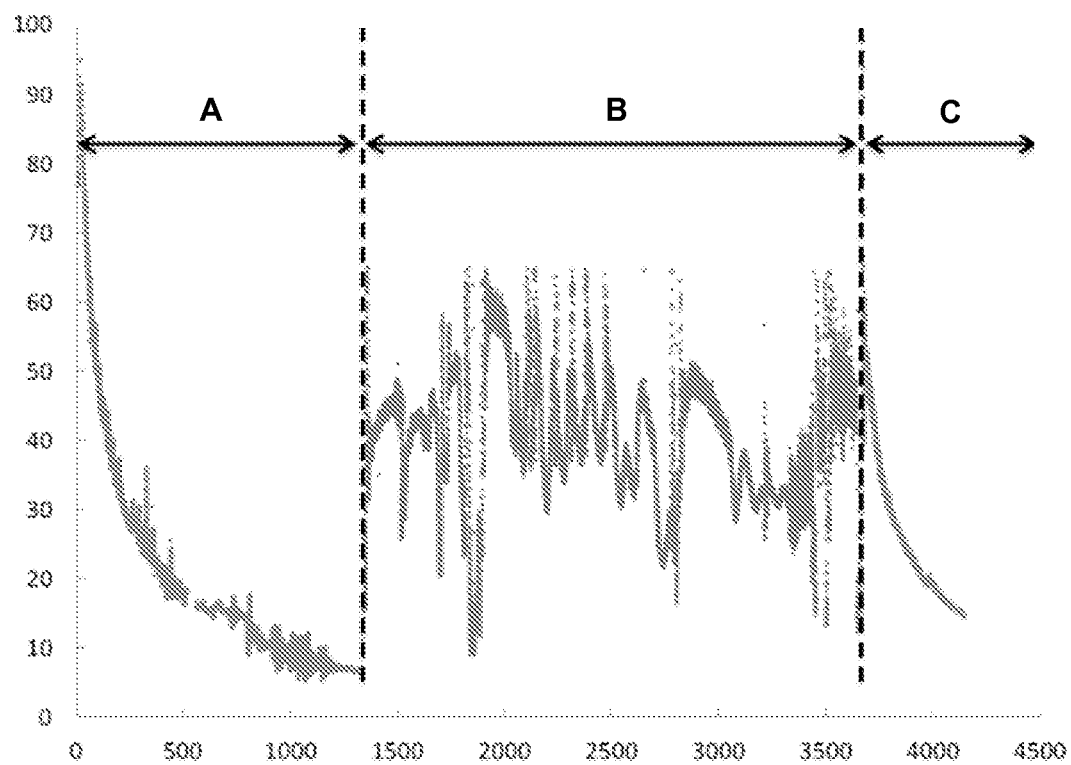
In FIGS. 1 and 2, injectivity was plotted in test experiments respectively in accordance with examples 2 and 3 below. Injectivity as a percentage of initial injectivity can be read on the Y-axis, while the injected volume can be read on the X-axis (in pore volumes).

The invention will now be described in more detail without limitation in the following description.

Surfactants

Surfactants are compounds which comprise a hydrophilic group (or hydrophilic head) and a hydrophobic group (or hydrophobic tail). Depending on the nature of the hydrophilic head, they are categorized into anionic surfactants (i.e. the hydrophilic group comprises a negatively charged group when the surfactant is in water), cationic surfactants (i.e. the hydrophilic group comprises a positively charged group when the surfactant is in water), zwitterionic surfactants (i.e. the hydrophilic group comprises both an anionic group and a cationic group when the surfactant is in water) and non-ionic surfactants (i.e. the hydrophilic group does not comprises any ionic group when the surfactant is in water).

The invention relies on the use of an anionic surfactant together with a non-ionic surfactant. More than one anionic surfactant may be used, and/or more than one non-ionic surfactant may be used.

In some embodiments, the Hydrophilic-Lipophilic Balance (HLB) of the or each anionic surfactant is from 1 to 15, preferably from 5 to 12.

In some embodiments, the HLB of the or each non-ionic surfactant is from 2 to 18, preferably from 4 to 15.

The HLB is determined according to the Davies method described in the following reference: Davies, *A quantitative kinetic theory of emulsion type, I. Physical chemistry of the emulsifying agent, Gas/Liquid and Liquid/Liquid Interface*, in *Proceedings of the International Congress of Surface Activity* (1957): 426-438.

The non-ionic surfactant is preferably of formula $R^1$—X, wherein $R^1$ is a saturated or unsaturated, linear or branched, aliphatic or aromatic group having from 10 to 18 carbon atoms, a mean degree of unsaturation from 0 to 3, and a mean degree of branching from 0 to 5, and X is a hydrophilic (non-ionic) group.

This surfactant can be a single compound or a mixture of compounds of formula $R^1$—X. In that case, the word "mean" in the paragraph above is to be understood as "molar-averaged".

$R^1$ may in particular be an alkyl group or an alkyl aryl group.

In some embodiments, the hydrophilic group X is selected from polyoxyalkylene groups, sorbitan groups, polyethoxylated sorbitan groups, polyglyceryl groups and glycosidic groups.

In some embodiments, the non-ionic surfactant is an alkyl alkoxylate compound ($R^1$ being an alkyl group and X being an alkoxylate or polyalkoxylate group).

In some embodiments, the non-ionic surfactant is of formula $R^1$—O—$(CH_2CH_2O)_p$—H, wherein $R^1$ is as defined above and is preferably an alkyl group, and p is a number from 1 to 20 and preferably from 10 to 15. Number p may be an integer or not (if it corresponds to a mean degree of ethoxylation).

The anionic surfactant is preferably of formula $R^2$—Y, wherein $R^2$ is a saturated or unsaturated, linear or branched, aliphatic or aromatic group having from 10 to 18 carbon atoms, a mean degree of unsaturation from 0 to 3, and a mean degree of branching of from 0 to 5, and Y is a hydrophilic (anionic) group.

$R^2$ may in particular be an alkyl group or an alkyl aryl group.

In some embodiments, the hydrophilic group Y is selected from sulfonate groups, sulfate groups and anionically modified polyoxyalkylene groups, such as sulfonate-terminated, carboxylate-terminated or sulfate-terminated polyoxyalkylene groups.

In some embodiments, the anionic surfactant is an alkyl ether sulfate. Said alkyl ether sulfate is preferably of the following schematic formula:

$$R^2\text{—O—}(CH_2CH(R^3)O)_m\text{—}(CH_2CH_2O)_n\text{—}SO_3^-M^+,$$

wherein:
$R^2$ is as defined above;
$R^3$ is an aliphatic or aromatic group having from 1 to 10 carbon atoms, and preferably from 1 to 6 carbon atoms,
m is from 1 to 20 and preferably from 5 to 10,
n is from 0 to 5 and preferably from 0 to 1, and
$M^+$ is a monovalent cation, preferably selected from $Li^+$, $Na^+$ and $K^+$, and more preferably $Na^+$.

In some embodiments, $R^3$ is an alkyl group or an aryl group.

In some embodiments, $R^3$ is selected from methyl, ethyl, n-propyl and/or phenyl groups. A methyl group is preferred, in which case the surfactant comprises propoxy groups.

Numbers m and n respectively correspond in a known manner to the mean number of alkoxy and ethoxy groups present in the surfactant. They may be integers or not (if a mixture of different molecules is used).

The sum m+n is from 1 to 25 and preferably from 5 to 10.

In preferred variations, m>n.

Hydrocarbon Recovery and Injection of Produced Water

According to the invention, hydrocarbons in gaseous and/or liquid phase are recovered from a subterranean formation. Preferably, hydrocarbon recovery includes oil recovery.

Water within the subterranean formation may have a salinity of from 0 to 250 g/L. Salinity is defined herein as the total concentration of dissolved inorganic salts in water, including e.g. NaCl, $CaCl_2$, $MgCl_2$ and any other inorganic salts.

The temperature within the subterranean formation may range from 25 to 140° C. If the temperature is relatively low, such as for instance not more than 70° C., anionic surfactants comprising a sulfate group may be used. Otherwise, it may be preferred to use anionic surfactants comprising a sulfonate or carboxylate group.

A production stream is recovered from the subterranean formation via one or more production wells.

The production stream comprises hydrocarbons, produced water and possibly other components such as solids and added chemicals.

The production stream may be separated into one or more hydrocarbon streams (for instance a liquid hydrocarbon stream and/or a gaseous hydrocarbon stream), optionally one or more solids streams (such as a stream of heavy solids and a stream of fine solids), and a stream of produced water, in one or more separation units. Said separation may be performed e.g. by decantation (notably in one or more separators, API separators or water tanks), flotation, cyclonic separation (hydrocyclones), centrifugation and/or by filtration.

Part or all (preferably all) of the stream of produced water is reinjected into the subterranean formation, in the form of a so-called reinjection stream, via one or more injection wells. Water other than produced water (such as fresh water) may be added to the produced water to form the reinjection stream, if necessary.

In some embodiments, the reinjection stream may comprise oil in a weight proportion of from 1 to 200 ppm, preferably from 1 to 100 ppm, and even more preferably from 1 to 50 ppm.

In some embodiments, the reinjection stream may comprise solid particles in a weight proportion of from 1 to 200 ppm, preferably from 2 to 100 ppm, and even more preferably from 5 to 20 ppm.

The solid particles are preferably mineral particles.

The maximum particle size of the solids particles ($D_v100$) may for example range from 1 μm to 20 μm, preferably from 1 to 10 μm.

The anionic surfactant and the non-ionic surfactant mentioned above are added to the water to form the reinjection stream. Other additives may optionally be added to the reinjection stream, such as further surfactants, salts, sacrificial agents, mobility control polymers, pH adjustment agents, solvents and/or marking agents.

Alternatively, an acid batch may be added in order to partly dissolve the solid particles of the produced water.

In some embodiments, the recovery of hydrocarbons is performed in a waterflooding process. In a waterflooding process, only water (in this case, including or consisting of produced water) is injected into the subterranean formation. No gas is injected. Waterflooding is an example of secondary recovery of hydrocarbons.

The anionic and non-ionic surfactants of the invention may be provided as one composition which is added to the water to provide the reinjection stream. Alternatively, the surfactants may be separately added to the water to provide the reinjection stream.

In some embodiments, the total concentration of the non-ionic surfactant(s) and anionic surfactant(s) in the reinjection stream is less than 500 ppm, or less than 400 ppm, or less than 300 ppm, or less than 200 ppm, or less than 100 ppm, or less than 75 ppm, or less than 50 ppm, or less than 30 ppm, or less than 20 ppm, by weight.

In some cases, part of the surfactants introduced into the subterranean formation is recovered in the produced water. In such cases, the addition of fresh surfactants to form the reinjection stream takes into account the surfactants already present in the produced water.

In some embodiments, the relative weight proportion of anionic surfactant(s) relative to the total of the anionic surfactant(s) and non-ionic surfactant(s) in the reinjection stream may be from 10 to 40%, or from 40 to 50%, or from 50 to 60%, or from 60 to 65%, or from 65 to 70%, or from 70 to 75%, or from 75 to 80%, or from 80 to 85%, or from 85 to 90%, or from 90 to 95%, or from 95 to 98%. Ranges of from 50 to 95%, from 65 to 90%, and from 75 to 85% are particularly interesting.

The surfactants of the invention may be added to the water at one or more injection points upstream of the bottom of the injection well(s), or at the head of the injection well(s), or downstream of, or in the separation unit(s).

Enhancement of Injectivity

The invention affords an enhancement in the injectivity of the injection well(s) through which the surfactant-complemented reinjection stream is introduced.

The injectivity of an injection well is herein defined as the ratio of the flow rate of the stream which is injected via the injection well (which in this case is the reinjection stream) to the pressure drop between the bottom hole pressure and the reservoir pressure at a distance from the well.

The invention can be implemented in a preventive and/or curative manner, i.e. to prevent or reduce a decrease in injectivity which is possible or likely; and/or to increase injectivity further to a decrease in injectivity.

If several injection wells are used in the context of hydrocarbon production, the invention can be implemented in one or more of these injection wells, either simultaneously or at different points in time.

Preferably, the invention may be implemented in a continuous manner, i.e. the reinjection stream comprising the surfactants of the invention is continuously injected into the subterranean formation, for a period of time of at least 1 day, or at least 1 week, or at least 1 month, or at least 2 months, or at least 3 months, or at least 4 months, or at least 6 months, or at least 1 year, or at least 2 years, or at least 3 years.

In some embodiments, the invention makes it possible to increase the injectivity of an injection well by a factor of at least 1.5, or at least 2, or at least 3, or at least 4, or at least 5, or at least 6.

This factor of increase is defined as the ratio of the injectivity of the injection well at one point in time when the invention is implemented (i.e. when the reinjection stream comprises the surfactants of the invention) relative to the injectivity of the injection at one point in time before the invention is implemented (i.e. at a point in time when the reinjection stream does not yet comprise the surfactants of the invention).

In some variations, this factor of increase is more precisely defined as the ratio of the time-averaged injectivity of the injection when the invention is implemented, to the minimum injectivity of the injection well during the period of time before the invention is implemented.

In other variations, this factor of increase is more precisely defined as the ratio of the injectivity of the injection well one month after the start of the implementation of the invention, to the injectivity of the injection well one month before the start of the implementation of the invention, wherein the start of the implementation of the invention is the point in time at which the surfactants of the invention are added for the first time to the produced water.

In some embodiments, the invention makes it possible to maintain or restore the injectivity of the injection well at a level of at least 30%, or at least 40%, or at least 50%, or at least 60%, or at least 70%, or at least 80%, relative to the maximal injectivity of the injection well which has been observed.

Usually, the maximal injectivity of an injection well is achieved at the beginning of the use of the injection well, before any clogging of the injection well has had a chance to occur.

Determination of the Nature and Proportions of Surfactants

In a preferred variation, the nature and/or the proportions of the anionic and non-ionic surfactants are selected in a selection step implemented before actually adding the surfactants to the produced water to form the reinjection stream, as described above. This preliminary step of selection makes it possible to optimize the efficacy of the surfactants depending on the characteristics of the subterranean formation.

To this end, several mixtures are prepared.

Each mixture comprises a portion of produced water (or of an aqueous solution having the same properties as the water produced from the subterranean formation, and in particular having the same salinity), a proportion of hydrocarbons (such as oil recovered from the subterranean formation or oil having similar properties to the oil recovered from the subterranean formation), a portion of at least one anionic surfactant and a portion of at least one non-ionic surfactant which are to be tested.

For instance, if a given anionic surfactant A and given non-ionic surfactant B are meant to be used, the different mixtures may include different relative proportions of A and B.

If several possible anionic surfactants are contemplated for use with a given non-ionic surfactant B, the different mixtures may include different combinations of various anionic surfactants with the non-ionic surfactant B (possibly in different possible proportions).

If several possible non-ionic surfactants are contemplated for use with a given anionic surfactant A, the different mixtures may include different combinations of various non-ionic surfactants with the anionic surfactant A (possibly in different possible proportions).

If several possible non-ionic surfactants as well as anionic surfactants are contemplated, the different mixtures may include different combinations of various non-ionic surfactants and various anionic surfactants (possibly in different possible proportions).

Each mixture is agitated for example in a vial or other container, and the visual aspect of the various mixtures is compared. Each mixture is left standing until a balance between the different phases is established. When an equilibrium is obtained, the mixtures are classified into three types of systems.

In some of the mixtures, droplets of oil may be dispersed in a water phase ("oil-in-water emulsion" or "Winsor 1"). In others, droplets of water may be dispersed in an oil phase ("water-in-oil emulsion" or "Winsor 2"). In yet others, a third intermediate phase may be obtained, with an oil/water micro-emulsion containing approximately as much as water as oil. Said "micro-emulsion" ("Winsor 3") is characterized in that it is stable over time and does not segregate into an oil phase and a water phase.

Once one or more mixtures in which such a micro-emulsion is present have been identified, the nature and/or proportions of the surfactants for the implementation of the invention are selected according to this mixture or to one of these mixtures.

The present test may be performed at ambient temperature, or preferably at the average temperature of bottom of the injection well.

EXAMPLES

The following examples illustrate the invention without limiting it.

Example 1

Experimental Setup

An experimental setup was made in a laboratory in order to simulate the behavior of an injection well.

A cylindrical glass tube was filled with a porous medium. The dimensions of the filled area of the tube were 17×2×2 mm. The porous medium was made with glass beads. Its porosity was comprised between 38 and 42%. The glass beads had a diameter of 38-45 µm. The estimated pore diameter was 4-10 µm. The experimentally determined permeability was 2-3 D.

Various liquid streams were circulated through the test tube and collected as a waste at the outlet of the test tube. A flowmeter was present at the outlet of the test tube. Pressure sensors were present both at the inlet and at the outlet of the test tube, in order to measure the pressure drop across the test tube. The test tube was lit by a white light, and the contents of the test tube were visually monitored by camera-assisted optical microscopy.

The incoming liquid stream was drawn from a temperature-controlled container. A bubbler was provided between said container and the inlet of the test tube in order to prevent any entry of gas.

A pressure controller was used to adjust the pressure at the inlet of the test tube as a function of the measured flow rate, so as to maintain the flow rate at a desired level. The average linear velocity corresponding to this flow rate in the porous medium was 6 cm/min.

The liquid stream was a recreation of produced water. It was made of water having a salinity of 67 g/L, to which the following components were added:
 crude oil at a weight concentration of 200 ppm, having a viscosity of 154 cP at 25° C. and an API gravity of 21.2°;
 solid particles of quartz at a weight concentration of 100 ppm, having an average particle diameter $D_v50$ of 1.6 µm;
 optionally, various surfactants.

Agglomerates of solid particles and oil in this liquid stream were found to have a maximum diameter of 18 µm.

Injectivity in this experimental setup was determined as the ratio of the flow rate to the pressure drop between the inlet and outlet of the test tube.

Example 2

Use of a Cationic Surfactant (Comparative)

The experimental setup of example 1 was used to test a cationic surfactant (quaternary ammonium salt).

As a first step (A), the liquid stream was injected without any surfactant. In this first step, the injectivity decreased down to approximately 10% of the initial (maximum) injectivity. Then, as a second step (B), the cationic surfactant was added to the incoming liquid stream at a weight concentration of 50 ppm. The injectivity in this second step was found to increase back to an average value of 40% of the initial injectivity, without any stabilization of the injectivity. As a third step (C), the addition of the surfactant was stopped, and the injectivity was observed to progressively decrease back to the level reached at step (A).

The detailed results are shown in FIG. 1.

The visual inspection of the contents of the test tube revealed that, when the cationic surfactant is used, a diphasic flow of oil and water is present within the pores, wherein the oil phase tends to coat the surface of the glass beads, and the solid particles are carried within the oil phase.

Example 3

Use of an Anionic Surfactant and a Non-Ionic Surfactant (Invention)

The experimental setup of example 1 was used to test a mixture consisting of 80 wt. % of an anionic surfactant (Aspiro S8310 from BASF, containing an alkyl ether sulfate group) and 20 wt. % of a non-ionic surfactant (containing an alkyl alkoxylate group).

As a first step (A), the liquid stream was injected without any surfactant. In this first step, the injectivity decreased down to approximately 10% of the initial (maximum) injectivity. Then, as a second step (B), the mixture of surfactants was added to the incoming liquid stream at a total weight concentration of 100 ppm. The injectivity in this second step was found to increase back to an average and stable value of approximately 70% of the initial injectivity.

Figure 2:
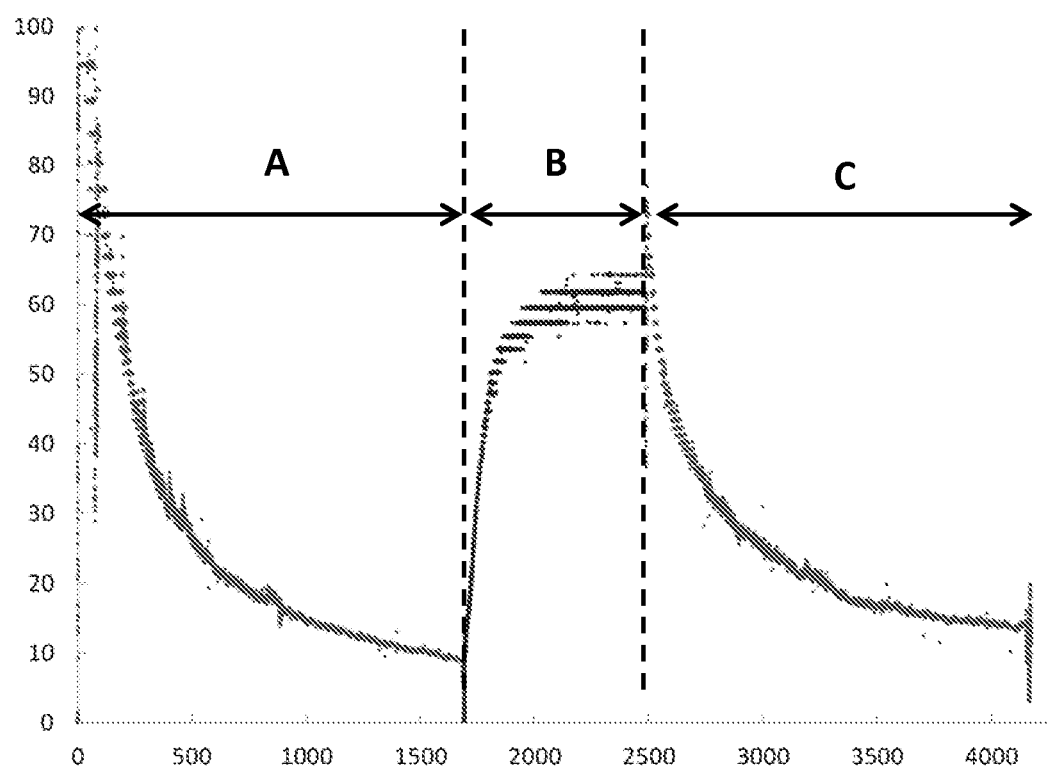

The detailed results are shown in FIG. 2.

The visual inspection of the contents of the test tube revealed that, when the mixture of anionic and non-ionic surfactant is used, oil droplets and small solid particles are separately carried within the water phase.

The invention claimed is:

1. A method for enhancing the injectivity of an injection well, comprising:
adding a non-ionic surfactant and an anionic surfactant to water produced from the well, to form a reinjection stream;
injecting the reinjection stream into a subterranean formation via the injection well such that the injectivity of the injection well is enhanced;
wherein the anionic surfactant is of the formula $R^2$—Y, wherein $R^2$ is a saturated or unsaturated aliphatic or aromatic group having from 10 to 18 carbon atoms, a mean degree of unsaturation from 0 to 3, and a mean degree of branching of from 0 to 5; and
wherein —Y is —O—$(CH_2CH(R^3)O)_m$—$(CH_2CH_2O)_n$—$SO_3^-M^+$, wherein:

$R^3$ is an aliphatic or aromatic group having from 1 to 10 carbon atoms,
m is from 1 to 20,
n is from 0 to 5, and
$M^+$ is a monovalent cation.

2. The method of claim 1, wherein the injectivity of the injection well is increased by a factor of at least 1.5 relative to the injectivity of the injection well when the non-ionic surfactant and the anionic surfactant are not present in the reinjection stream containing produced water which is injected into the subterranean formation by the injection well.

3. The method of claim 1, wherein the injectivity of the injection well is maintained or restored at a level of at least 30%, relative to the maximal injectivity of the injection well.

4. The method of claim 1, wherein the total concentration of the non-ionic surfactant and anionic surfactant in the reinjection stream is less than 500 ppm by weight.

5. The method of claim 1, wherein the non-ionic surfactant is of formula $R^1$—X, wherein $R^1$ is a saturated or unsaturated aliphatic or aromatic group having from 10 to 18 carbon atoms, a mean degree of unsaturation from 0 to 3, and a mean degree of branching of from 0 to 5, and X is a hydrophilic group selected from the group consisting of polyoxyalkylene groups, sorbitan groups, polyethoxylated sorbitan groups, polyglyceryl groups and glycosidic groups.

6. The method of claim 5, wherein —X is —O—$(CH_2CH_2O)_p$—H, and wherein p is from 1 to 20.

7. The method of claim 1, wherein the weight proportion of anionic surfactant relative to the total of the anionic surfactant and non-ionic surfactant in the reinjection stream is from 50 to 95%.

8. The method of claim 1, wherein the anionic surfactant and non-ionic surfactant are continuously added to the produced water for a period of time of at least 1 month.

9. The use of claim 1, wherein a nature and/or a proportion of the non-ionic surfactant and the anionic surfactant are selected by preparing a plurality of mixtures of non-ionic surfactant, anionic surfactant, produced water or simulated produced water, and oil, agitating the plurality of mixtures and identifying a mixture which provides a water/oil microemulsion.

10. A method of extracting hydrocarbons from a subterranean formation, comprising:
collecting a production stream comprising hydrocarbons and produced water from at least one hydrocarbon production well;
separating the production stream into at least one or more hydrocarbon streams as well as a stream of produced water;
continuously adding a non-ionic surfactant and an anionic surfactant to at least part of the stream of produced water to provide a reinjection stream;
continuously injecting said reinjection stream into the subterranean formation by at least one injection well
wherein the anionic surfactant is of formula $R^2$—Y, wherein $R^2$ is a saturated or unsaturated aliphatic or aromatic group having from 10 to 18 carbon atoms, a mean degree of unsaturation from 0 to 3, and a mean degree of branching of from 0 to 5; and
wherein —Y is —O—$(CH_2CH(R^3)O)_m$—$(CH_2CH_2O)_n$—$SO_3^-M^+$, wherein:
R3 is an aliphatic or aromatic group having from 1 to 10 carbon atoms,
m is from 1 to 20,
n is from 0 to 5, and
M+ is a monovalent cation.

11. The method of claim 10, wherein the injection well has an injectivity which is maintained or restored at a level of at least 30%, relative to its maximal injectivity.

12. The method of claim 10, wherein the total concentration of the non-ionic surfactant and anionic surfactant in the reinjection stream is less than 500 ppm, by weight.

13. The method of claim 10, wherein the non-ionic surfactant is of formula $R^1$—X, wherein $R^1$ is a saturated or unsaturated aliphatic or aromatic group having from 10 to 18 carbon atoms, a mean degree of unsaturation from 0 to 3, and a mean degree of branching of from 0 to 5, and X is a hydrophilic group selected from polyoxyalkylene groups, sorbitan groups, polyethoxylated sorbitan groups, polyglyceryl groups and glycosidic groups.

14. The method of claim 13, wherein —X is —O—$(CH_2CH_2O)_p$—H, wherein p is from 1 to 20.

15. The method of claim 10, wherein the weight proportion of anionic surfactant relative to the total of the anionic surfactant and non-ionic surfactant in the reinjection stream is from 50 to 95%.

16. The method of claim 10, wherein the method is continuously implemented for a period of time of at least 1 month.

\* \* \* \* \*

UNITED STATES PATENT AND TRADEMARK OFFICE
CERTIFICATE OF CORRECTION

PATENT NO. : 11,299,666 B2
APPLICATION NO. : 16/763530
DATED : April 12, 2022
INVENTOR(S) : Bertrand Levache Page 1 of 1

It is certified that error appears in the above-identified patent and that said Letters Patent is hereby corrected as shown below:

In the Claims

Column 12, Line 63, Claim 10, delete "R3" and insert --$R^3$--.

Column 12, Line 67, Claim 10, delete "M+" and insert --$M^+$--.

Signed and Sealed this
Ninth Day of August, 2022

Katherine Kelly Vidal
*Director of the United States Patent and Trademark Office*